United States Patent
Khemani

(10) Patent No.: US 9,438,672 B2
(45) Date of Patent: Sep. 6, 2016

(54) METHOD FOR CLIENT SPECIFIC DATABASE CHANGE PROPAGATION

(71) Applicant: Prakash Khemani, Saratoga, CA (US)

(72) Inventor: Prakash Khemani, Saratoga, CA (US)

( * ) Notice: Subject to any disclaimer, the term of this patent is extended or adjusted under 35 U.S.C. 154(b) by 255 days.

(21) Appl. No.: 14/181,587

(22) Filed: Feb. 14, 2014

(65) Prior Publication Data

US 2015/0237127 A1 Aug. 20, 2015

(51) Int. Cl.
*G06F 17/30* (2006.01)
*H04L 29/08* (2006.01)
*H04L 29/06* (2006.01)

(52) U.S. Cl.
CPC ..... *H04L 67/1095* (2013.01); *G06F 17/30339* (2013.01); *G06F 17/30575* (2013.01); *H04L 67/2833* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 2003/0225585 A1* | 12/2003 | Miller | G06F 17/30067 705/1.1 |
| 2005/0055382 A1* | 3/2005 | Ferrat | G06F 17/30575 |
| 2005/0165858 A1* | 7/2005 | Tom | G06F 17/30575 |
| 2007/0061487 A1 | 3/2007 | Moore | |
| 2011/0252181 A1 | 10/2011 | Ouye et al. | |
| 2012/0166401 A1 | 6/2012 | Li | |

FOREIGN PATENT DOCUMENTS

EP  0890914 B1  8/2009

* cited by examiner

*Primary Examiner* — Anh Tai Tran
(74) *Attorney, Agent, or Firm* — Henry J. Cittone; Cittone & Chinta LLP

(57) ABSTRACT

A new method is provided for a database client to interact with a database server that allows the client to observe all changes happening in the server. Using this method is efficient to aggregate changes at the database record level before delivering them to the client. The method can also ensure exactly-once delivery of every change to the client. This method is implemented in the database server by a new data structure that maintains all database pages being modified on a linked list. Any database can incorporate this method to provide this aggregated, exactly-once change observation functionality.

13 Claims, 6 Drawing Sheets

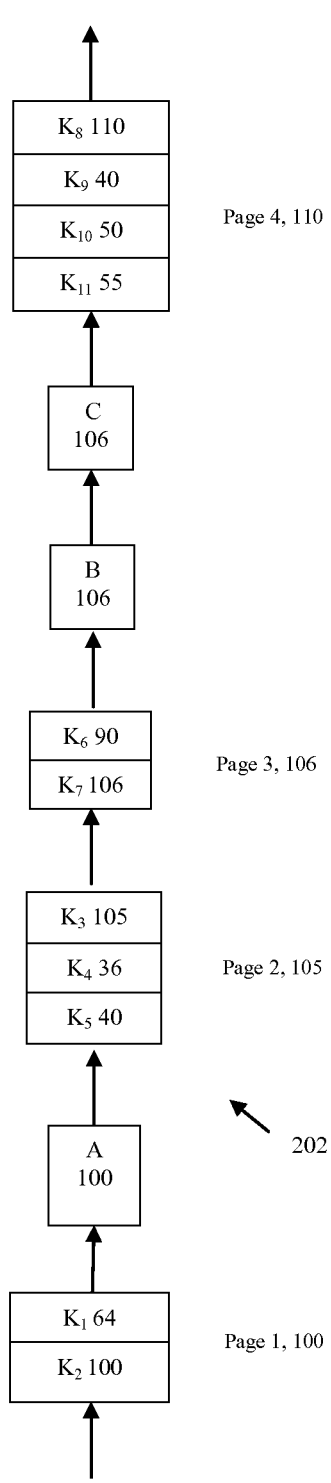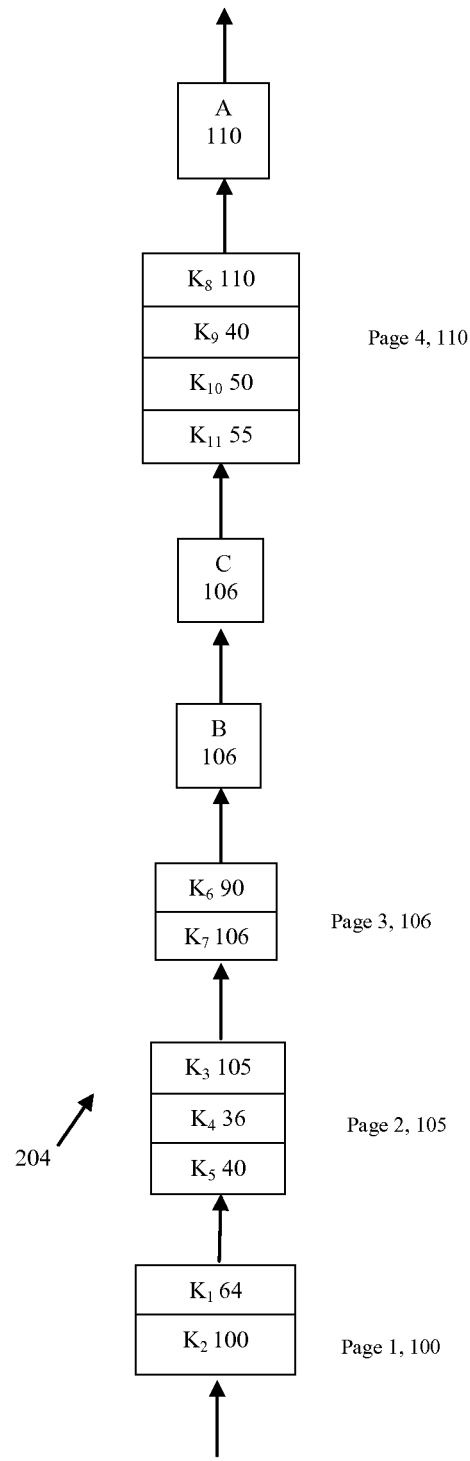
FIG. 1A
FIG. 1B

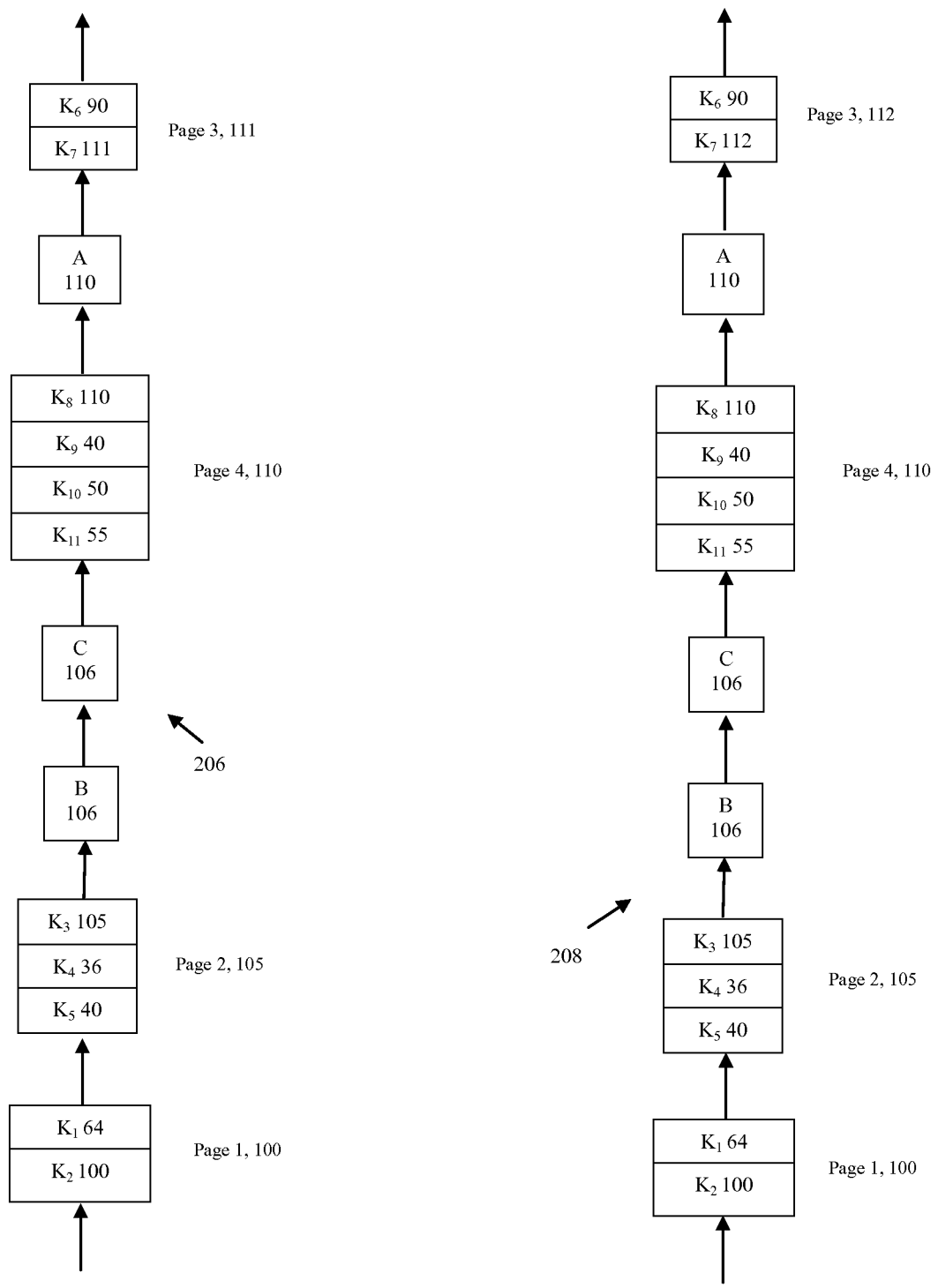
FIG. 1C  FIG. 1D

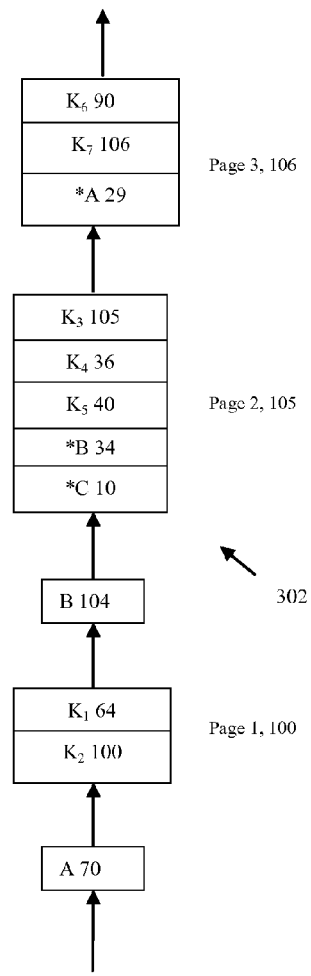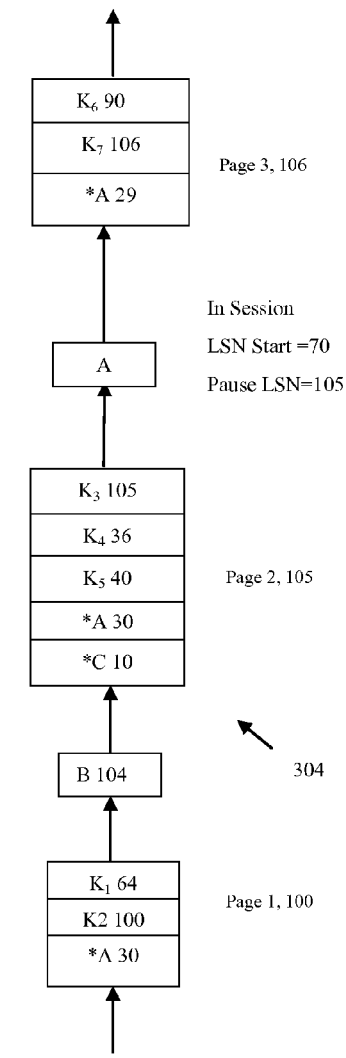
*FIG. 2A*
*FIG. 2B*

METHOD FOR CLIENT SPECIFIC DATABASE CHANGE PROPAGATION

FIELD OF THE INVENTION

The present invention relates to a database management system and more particularly to a method for client specific optimal change propagation in a data store.

BACKGROUND

Databases typically have a Transaction Log (also known as REDO log or Write Ahead Log) that is a history of all updates executed by the database management system to guarantee the Durability property of transactions across crashes and hardware failures. The transaction log is a primal component of the database. Increasingly, this same transaction log is being employed in other data processing tasks beyond database recovery. A common approach that is utilized to track the changes in the database records is to "tail" the log, a process that reads the log records in the order of their Log Sequence Number (LSN). Every record in the database transaction log uniquely identifies a transaction and is assigned a monotonically increasing Log Sequence Number (LSN). Log tailing is often used for: database replica maintenance (a process called log shipping); to observe all changes happening in the database and to further act upon those changes; and database backup.

There are several nice properties of Log Tailing that makes it suitable for these tasks. The clients tailing the log have to maintain an offset into the log and they are guaranteed exactly-once delivery of all the changes happening in the database or data store. The client can download the log at a rate which suits them as opposed to the server pushing the logs to them. The same log can serve virtually unlimited number of clients. In case of failure of the database server or the log client, it is possible to restart the tailing process at the earlier offset without missing or duplicating any update.

However, log tailing becomes less attractive with increases in write throughput on the database. As the log volume increases, the amount of work that the log tailers need to do increases proportionately. In such scenarios, load on the Log observers can be reduced if somehow it is possible to collapse updates to the same database record into a single update for the Log observer.

The desire to collapse large volume changes at the database record level has led to creation of other ad-hoc mechanisms. These typically involve aggregating the updates for a short duration and flushing these updates periodically to another storage system. The client can consume the reduced volume of changes from this other storage system. This mechanism is unsuitable because it is difficult to provide reliability and exactly once semantics, unless performance killing distributed transactions are used. The load decreases, but by a fixed amount, for all change observers whereas slower observers could have benefitted from even longer aggregation. Also, the presence of another storage system adds another layer of complexity.

The present invention discloses a method that possesses all the good properties of log tailing method and at the same time provides a database record level aggregation of changes for each client. In one possible implementation of this scheme the client receives exactly the set of database records that changed since its last call. Multiple updates to a database record in the time window since the client's last call results in a single update for the client. This method of client interacting with the database or data store is being called Tail Aggregated or TAGG.

ABBREVIATIONS AND DEFINITIONS

The abbreviations and a few novel terms that will be used herein to describe the inventions have been explained in the following paragraphs.

Database: Any data storage system that logically organizes its storage into records where each record has a key field that uniquely identifies the record. This storage system at least supports inserting new records and modifying existing records. The storage system is not required to support any particular query method.

Transaction: A transaction is a group of database operation where a set of database records are inserted or modified.

Log Sequence Number (LSN): The database assigns every transaction a monotonically increasing number known as the Log Sequence Number (LSN). LSNs are ordered such that if LSN2 is greater than LSN1, the change described by the transaction referred to by LSN2 occurred after the change described by the transaction LSN1. All the changes described by transaction LSN1 are completed before any change described by transaction LSN2.

Key-Value: A database record can be seen as consisting of two parts—the Key and the Value part. The Key part uniquely identifies the record and the database uses this field to locate the record in its storage. The rest of the database record is the Value of this Key.

Key LSN: The LSN at which the database record referred to by the Key was last modified. Each database record explicitly stores this value because it is needed during database recovery.

Database Access Structure: The data structure used by the database to locate a particular key. B-Tree and Hash Tables are examples of such structures. These are typically hierarchical data structures where the topmost node refers to all database records and the leaf nodes refer to an individual database record.

Page: Database management systems typically group database records into pages and manage space (in memory or on disk) in unit of pages. Depending on implementation pages could be of fixed or variable size; a page can have fixed number or variable number of database records. Even if a database doesn't explicitly refer to a unit of data organization as a page, the node in the Database Access Structure hierarchy just above the leaf database records can be treated as a page of database records. For example in a Hash Table based data structure, all the database records referred to by a Hash Table slot can be treated as a page.

Page LSN: LSN of a page is the maximum Key LSN of all the database records contained in the page.

<Kx; LSN y>: <Kx; LSN y> denotes the key x with LSN number y.

TAGG: "Tail Aggregation (TAGG)" refers to a new method aggregating all the changes that have happened in the database.

SUMMARY OF THE INVENTION

In a first aspect, an interface for interacting with a database; allowing a database client to register itself with the database; and allowing the database client to observe all changes happening in the database, wherein each change record delivered to the database client is the result of processing applied to aggregation of the updates to a data record; wherein the change records are delivered in batches where each batch comprises exactly the set of changes that happened in a well defined Log Sequence Number range is provided.

In a second aspect, a method for a database server to support clients that want to observe all changes happening in the database server, the method assigning a log sequence number to each database record and each page present in the database; maintaining a chain which is a linked list of all the pages in the order they are modified; maintaining a state for a plurality of clients on the chain, where the position of the client's state on the chain specifies the location from where to find changes that have not yet been served to the client; maintaining a plurality of landmark nodes on the chain to help initially place clients on the chain when they register; scanning all the pages in the chain from where the client's state is located to the top of the chain, thereby collecting all changed database records that have not yet been delivered to the client, wherein multiple updates to a database record is delivered as a single change record to the client; identifying the changed database records that have to be served while scanning the chain; applying further processing to each database record and its aggregated updates to create corresponding change records; and delivering the changed records to the client is provided.

In a third aspect, a method for a database server to support clients that want to observe all changes happening in the database server, the method assigning a log sequence number to each database record and each page present in the database; maintaining a chain which is a linked list of all the pages in the order they are modified; maintaining a state for a plurality of clients on the chain, where the position of the client's state on the chain specifies the location from where to find changes that have not yet been served to the client; maintaining a session for each client while changes are being collected for a client; maintaining enough session state to ensure exactly once delivery of each change further comprising; managing space for the session state management; maintaining a plurality of landmark nodes on the chain to help initially place clients on the chain when they register; scanning all the pages in the chain from where the client's state is located to the top of the chain, thereby collecting all changed database records that have not yet been delivered to the client, wherein multiple updates to a database record are delivered as a single change record to the client; identifying the changed database records that have to be served while scanning the chain; applying further processing to each database record and its aggregated updates to create corresponding change records; and delivering the changed records to the client is provided.

BRIEF DESCRIPTION OF THE DRAWINGS

Further objects, features and advantages of the present invention will become apparent from the following detailed description taken in conjunction with the accompanying figures showing illustrative embodiments, results and/or features of the exemplary embodiments of the present invention, in which:

FIGS. 1A, 1B, 1C, 1D and 1E are schematic diagrams of the tagger chain that demonstrate how the relative position of pages and client nodes change as database records are modified and as clients complete TAGG sessions.

FIGS. 2A, 2B, 2C and 2D are schematic illustrations of a tagger chain with clients' states maintained at the page level.

Figure 1E:
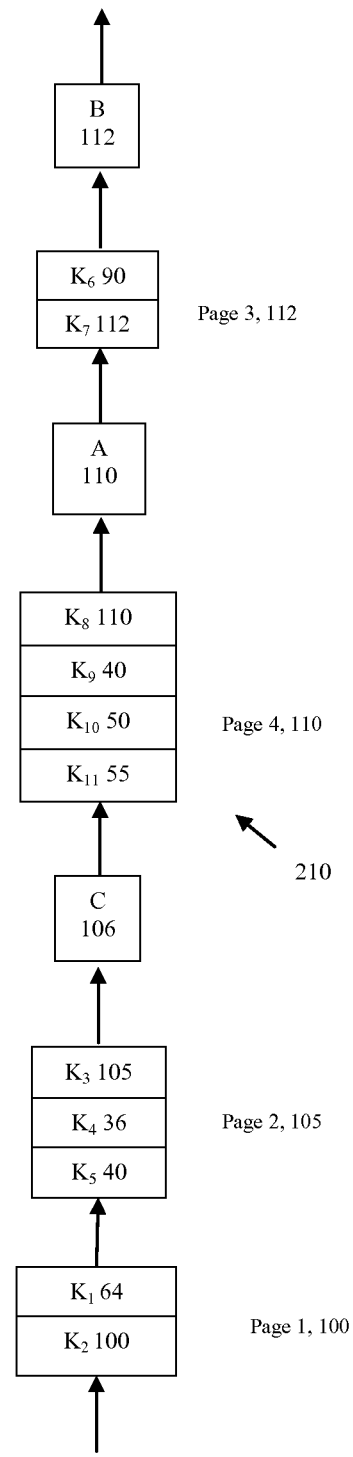

Throughout the drawings, the same reference numerals and characters, unless otherwise stated, are used to denote like features, elements, components, or portions of the illustrated embodiments. Similar features may thus be described by the same reference numerals, which indicate to the skilled reader that exchanges of features between different embodiments can be done unless otherwise explicitly stated. Moreover, while the present invention will now be described in detail with reference to the figures, it is done so in connection with the illustrative embodiments and is not limited by the particular embodiments illustrated in the figures. It is intended that changes and modifications can be made to the described embodiments without departing from the true scope and spirit of the exemplary embodiments of the present invention as defined by the appended claims.

DETAILED DESCRIPTION

The present invention provides a method and a system to keep track of changing database records and propagates those changes to a client system. The database consists of Key-Value records organized into pages. Each database record contains the Key LSN where the Key LSN is a LSN at which the database record referred to by the Key was last modified. Each database record explicitly stores this value because it is needed during database recovery.

In an embodiment of a method of the present invention the database has a page table wherein each database data page has an entry that stores the page's metadata. The page table does not need to have any particular physical layout. The page table can be an in-memory resident table or the page metadata entries can be a part of the page itself. The only need is to have an ability to chain the pages and to be able to manipulate that chain. The per-page information needed for maintaining this chain of pages is stored inside the page's metadata. Page LSN is the maximum Key LSN of all data records stored in the page. The page meta data also stores the Page LSN. The Page LSN in the page metadata is used to recover the aforementioned page-chain at database startup.

There is no constraint on how the database or data store defines a page. The pages in the database can be of a fixed size or of a variable size. The method of the present invention requires the need to maintain state for active TAGG sessions in a page. If the pages are of variable size then the state can be maintained in the page itself or else the state has to be maintained in a separate data structure.

The foregoing method is compatible with all the existing databases or data stores and is independent of the access structure used by the database to locate a key and its page. The database records in the page can be accessed using a hash index or a B-Tree index or other indexing mechanism.

Pluralities of TAGG clients are engaged in continuously pulling the changes happening in the database server. Before initiating any call, the TAGG client has to register with the database server. The database server maintains a small amount of state for every registered TAGG client. The amount of state is small enough so that a large number of clients can be supported.

The TAGG client interested in pulling the changes follows the following steps while interacting with the database server:

The client first registers itself with the database server. At registration time, a client can specify where it wants to start fetching the changes from. The client has various choices like all subsequent changes or changes since some time in the past or changes since a particular LSN or some other offset mechanism supported by the database server. On successful registration, the client gets an initial LSN (Log Sequence Number) L0. The subsequent TAGG sessions will download all the keys and only those keys that change at LSN greater than LSN L0. The first TAGG session will have its L-start value set to L0.

After registration, the client makes TAGG calls to pull the changes from the database server. The changes are downloaded over TAGG sessions where a TAGG session can span one or more TAGG calls. The first TAGG call initiates the TAGG session. If a TAGG session is not completed in a single TAGG call, then subsequent TAGG calls are made by the client till the TAGG session ends. Each TAGG call returns a set of change records. When a TAGG call also returns the LSN value L-end in addition to the set of change records then the client knows that the TAGG session has ended. By ending TAG session at L-end the database server is providing the guarantee that the client has received all changes that happened at or before LSN L-end.

A typical TAGG client will consume all the change records received in a TAGG session before it initiates another TAGG session.

The client can unregister itself if it no longer wishes to download any more data from the server. The server cans also timeout a client after a period of inactivity.

A client cannot have multiple TAGG sessions or multiple outstanding TAGG calls.

A TAGG session for the client begins at a LSN L-start and ends at LSN L-end. The LSN L-start is the LSN L-end of the previous TAGG session or the initial LSN L0 for the client's first TAGG session. At the end of the session, the database server guarantees that all the database records and only those database records that were modified in the LSN range (greater than L-start and smaller than or equal to L-end] are downloaded. And no database record with same Key LSN is downloaded more than once.

Sometimes a TAGG session does not get completed in a single TAGG call and the client has to make multiple calls to complete the TAGG session. This may happen because of many reasons, such as in a given call the client specified response size limit or timeout might have expired; or the server might decide to end a call early because of its own resource management policy.

The client receives the LSN of every modified database record that TAGG serves. The client can use this LSN value to guarantee exactly-once consumption of changes across failures. Upon restart, after client or server failure, the client has to reregister and restart the last incomplete session. In this scenario, if the client had partially applied the changes from the last session then the client can end up applying those changes more than once. The client has to maintain enough state from the last incomplete session to avoid consuming a change more than once. The key LSNs that were received will help the client maintain this information.

In normal conditions, the TAGG client receives changes aggregated exactly once at the database record level and the clients need not worry about duplicate changes being present in the TAGG result set. It is only when they are recovering from the server or own failure that the clients have to enter a mode where they have to do extra processing to ensure exactly-once behavior.

Log Sequence Numbers (LSN) plays an important role in the method. Every database record is associated with Key LSN—the LSN at which it was last modified. The Page LSN—LSN of a page—is defined as the maximum Key LSN of all the database records contained in the page.

In an embodiment of the present invention, the database server maintains a Tagger Chain that contains the linked list of all the pages, wherein the pages are arranged in the increasing order of page LSN. The topmost page in the chain is a page that contains a most recently modified database record. The bottom most page in the Tagger Chain has database records that have been modified before all other database records in the system. Every time a database record is updated, the corresponding page is moved to the top of the Tagger Chain. Since multiple database records can get modified in a transaction therefore the commitment of a transaction can cause multiple pages to move to the top of the tagger chain and multiple database records can be associated with the same Key LSN. The Tagger chain essentially contains all the pages that have changed in the order in which they were modified.

In addition to the database pages, the tagger chain also contains nodes for each registered TAGG client. A TAGG client's node's position in the tagger chain keeps track of those pages that contain database records that the client has not yet downloaded.

The third kinds of entities present on the tagger chain are the landmark nodes. These nodes are periodically inserted at the top of the tagger chain. They help the server quickly locate the initial position on the tagger chain for a TAGG client at registration time.

All nodes in the tagger chain are associated with a LSN that form a non-decreasing sequence from bottom to top of the tagger chain. The database pages are associated with the Page LSN. The TAGG client nodes are associated with L-start or L-pause and one of them, depending upon whether the client is in TAGG session or not, is the maximum Key LSN among all database records that have been collected for the client. The landmark nodes are given the LSN of the topmost page in the tagger chain when they are inserted at the top of the chain. For any node on the tagger chain, all pages below this node have database records with Key LSN smaller than or equal to the LSN associated with the LSN. And all pages above the aforementioned node have at least one database record that has Key LSN greater than the LSN associated with the node.

A client's TAGG session starts at L-start, the LSN associated with the client's node in the tagger chain at the start of the session. During the TAGG session, the database server scans all pages from the client's node's current position in the Tagger chain to the top of the chain, collecting all the database records with Key LSN greater than L-start. At the end of the TAGG session the client node would have moved to the top of the tagger chain. The TAGG session ends at L-end—the maximum Key LSN of the database records collected in that session. At the end of the TAGG session the client node's L-start, its LSN in the tagger chain, would have been set to L-end of the session so that the next session can start collecting database records beyond L-end. During a TAGG session that starts at LSN L-start and ends at LSN L-end the database Server collects all and only those database records that were modified in this LSN range and no database record is collected more than once at the same Key LSN.

Each time a client completes a TAGG session it gets a set of database records that changed since the client last came in. The system efficiently keeps track of what has changed for each registered client since its last visit FIGS. 1A-E is a schematic diagram of the tagger chain that demonstrates how the relative position of pages and client nodes change as database records are modified and as clients complete TAGG sessions. FIG. 1A, step 202, shows a tagger chain with 11 database records spread across four pages. The pages and the database records are associated with a Log Sequence Number (LSN) that signifies the order of modifications that are taking place in the database. Each time a database record is modified, a Log Sequence Number (LSN) is assigned to that change. The LSN of the page is the maximum Key LSN of the database records contained in that page. Page 1 contains database records <K1; LSN 64> and <K2; LSN 100>, Page 2 contains database records <K3; LSN 105>, <K4; LSN 36>, and <K5; LSN 40>. Page 3 contains database records <K6; LSN 90> and <K7: LSN 106>. Likewise Page4 contains database records <K8; LSN 110>, <K9; LSN 40>, <K10; LSN 50>, and <K11; LSN 55>.

The LSN of Page1, Page2, Page 3 and Page 4 are 100, 105, 106 and 110 respectively.

The tagger chain also shows the nodes of 3 registered clients—client A, client B and client C. The number of clients shown here is for illustration purpose only and the system can maintain the state for a large number of clients. The L-start value for client A is 100, for client B it is 106 and for client C it is 106. A TAGG session fetches all the database records with Key LSN greater than the L-start. FIG. 1B, step 204 shows the state of tagger chain after client A has completed a TAGG session and moved to the top of the tagger chain. The session collected database records in the LSN range (100, 110] where 100 was the LSN associated with client A at session start and 110 is the maximum LSN in the system. The collected database records are <K3; LSN 105>, <K7; LSN 106>, and <K8; LSN 110> from Pages 2, 3 and 4 respectively. In each page the TAGG process skipped over those database records that did not have Key LSN greater than L-start. FIG. 1 does not show the processing that the TAGG process has to do during the TAGG session. The state that is maintained in each page visited during the TAGG session (Pages 2, 3 and 4 in this case) is logically erased by the end of the TAGG session and is not shown here.

FIG. 1C, step 206, shows that database record K7 is modified in page 3. The LSN of database record K7 increases from 110 to 111. Database record K7 is present on page 3, therefore, the Page 3 LSN increases from 106 to 111 and Page 3 moves to the top of the tagger chain.

FIG. 1D, step 208 shows that the database record K7 is modified again and its LSN increases from 111 to 112. Page 3's LSN increase to 112 and it stays at the top.

FIG. 1E, step 210, shows the state of the tagger chain after client B has completed a TAGG session and collected all changes in the LSN range (106, 112]. The server identifies the data records that were updated since client B's last visit. Client B collects <K8; LSN 110> and <K7: LSN 112> in this TAGG session. The system is able to aggregate two updates to database record K7 into single update to client B.

It is impractical to assume that a database will be able to scan the tagger chain from L-start at TAGG session start to the top of the chain without any database records getting modified concurrently. A desire for low latency updates will dictate that any database would want to modify the database records concurrently with TAGG sessions. Furthermore, a TAGG session might have to pause without reaching the top of the tagger chain because a timeout might have expired or the output size might have reached a maximum. The effect of concurrent modification of database records is that a TAGG session might reencounter a page that it has already visited and collected. Because of the concurrent modifications the TAGG process has to remember what database records it has already collected in the session.

In an embodiment of the present invention a method is provided that keeps track of all the database records that have been already collected during a TAGG session so that they are not served again at the same Key LSN. There are many simple but inefficient ways of implementing this, like maintaining state at per database record level, or collecting database record in another Hash Set like data structure.

In an embodiment of the present invention, the method efficiently maintains the state of the client's TAGG session at page level. The state is maintained in each page that is visited by the TAGG session. The maximum space needed in a page is of the order of the number of active sessions. When the session is completed the state storage space in the visited pages can be reclaimed. The state does not have to be physically a part of the page. The per-page state can be stored in a separate in-memory data structure.

There is a TAGG session table in the system that tracks all registered clients. Each registered client is associated a client ID and with a monotonically increasing session ID. The system never reuses a client ID even across restarts. When the client registers then its session ID is zero. The session ID increases at the end of every session. The client ID and session ID is used to mark pages that have been visited by a TAGG session. Every time a page is visited in a TAGG session a special record containing the client ID and the TAGG session ID is associated with the page. At the end of the TAGG session when the session ID is incremented then all such special records created during this session are logically deleted. When the system encounters a special record it can tell whether it is deleted or not by consulting the TAGG session table. A special record is logically deleted if the client ID is no longer registered or if the session associated with the session ID has ended. The session associated with the session ID has ended if the TAGG session table has a new session ID corresponding to the special record's client ID. The system lazily reclaims space for all deleted special records. After a restart all persisted special records in the pages are logically deleted because the clients ID referred to by these records will never be reused by the system.

A TAGG session yields control for concurrent modifications only at page boundaries. When it has to yield control then it re-inserts the client node above the page it has just collected. The client node's L-start value is left unchanged—it continues to be set to the LSN at which the session started. The client node is associated with a new LSN value called L-Pause that is the page LSN of the page that was just collected. LSN L-Pause corresponds to the client's node position on the tagger chain while the TAGG session is paused. LSN L-start continues to refer to the position in the tagger chain where the TAGG session had started.

While the TAGG session is paused some pages that were already visited by the session might be modified and can move above the paused client node's position in the tagger chain. When the TAGG session resumes and starts scanning pages from the where client node is present in the tagger chain toward the top of the tagger chain then these visited pages will be reencountered. The collection rule followed by the TAGG process is that if a page has not been visited in the TAGG session, then collect all the keys in the page that have LSN greater than L-start. And if a page has already been visited in the TAGG session then collect all the keys in the page that have LSN greater than L-pause. This rule ensures that all database records with Key LSN greater than L-start will get collected until the session ends when the TAGG process reaches the top of the tagger chain and that a database record is never collected more than once at the same Key LSN.

Figures 2C, 2D:
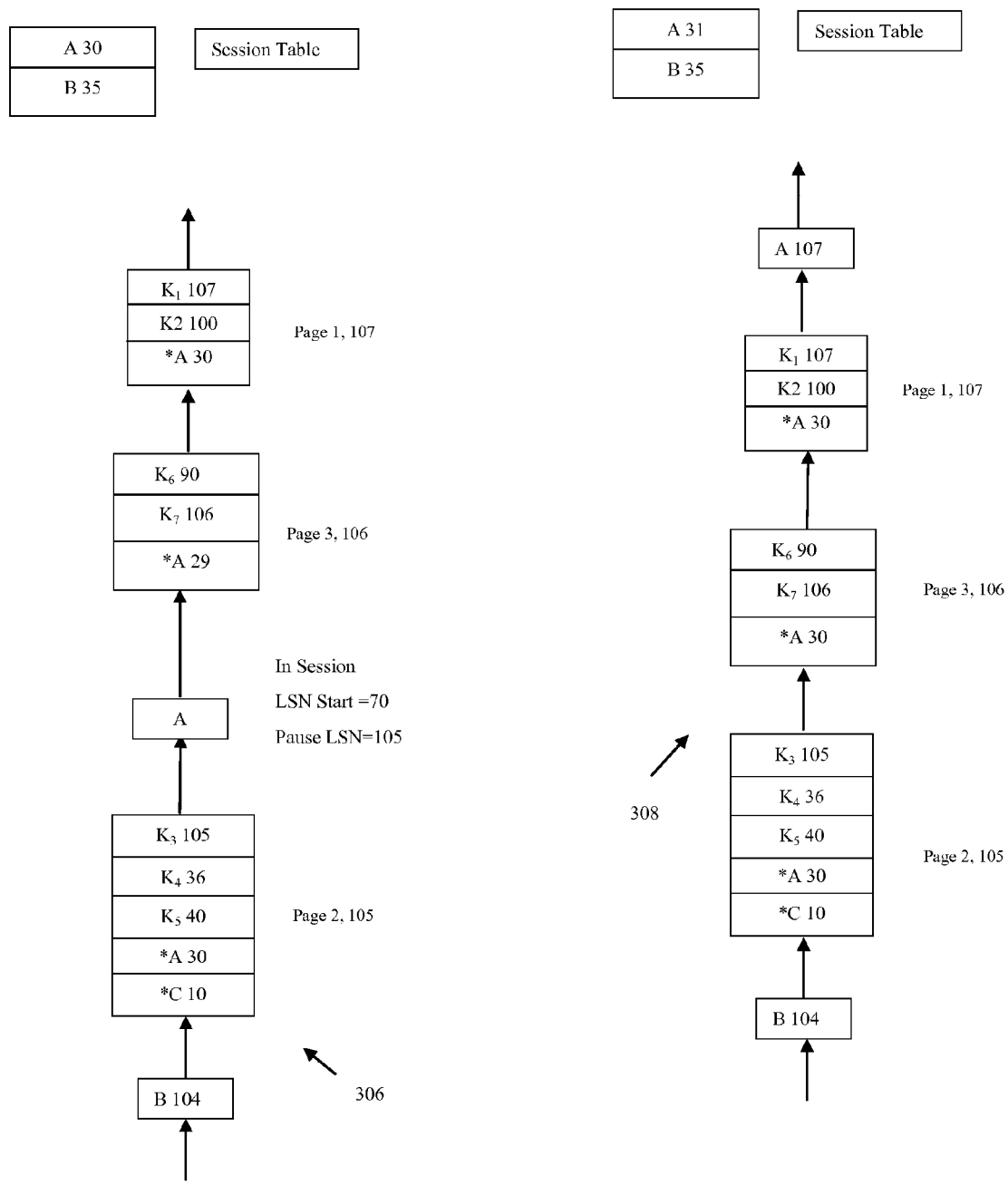

FIGS. 2A-D are a schematic illustration of a tagger chain with clients' states maintained at the page level. In FIG. 2A, step 302, the tagger chain shows 7 database records spread over 3 pages and the position of two clients. Page 1 contains database records <K1; LSN 64> and <K2; LSN 100>. Page 2 contains database records <K3; LSN 105>, <K4; LSN 36> and <K5; LSN 40>. Lastly, Page 3 contains database records <K6; LSN 90> and <K7; LSN 106>. The LSN of Page 1, Page 2 and Page 3 are 100, 105 and 106 respectively.

Client A and client B are registered on the tagger chain at session ID 30 and 35 respectively. The L-start for Client A is LSN 70 and for Client B it is LSN 104.

Page 2 and page 3 have special records marked with * that contain a TAGG client id and a session ID. The presence of this special record in a page signifies that this page was visited by the TAGG session identified by the given TAGG client id and the session id. In the FIG. 2(a) the * records show that the page 2 was visited by client B and client C in their TAGG sessions 34 and 10 respectively. Similarly, client A visited page 3 in its TAGG session 29. These are all completed TAGG sessions and the system can reclaim the space used by these keys without any harm. Page 1 that does not have any such special key and is possibly one such page where the background processing in the system has reclaimed the space occupied by logically deleted special records.

In FIG. 2B, step 304, client A starts its TAGG session with session ID equal to 30 and collects database records <K2; LSN100> from page 1 and <K3; LSN 105> from page 2. The system marks page 1 and page 2 as visited by putting special key for A (*A, 30). This implies that client A has visited page 1 and page 2 in its session ID 30. The system is able to use the space of logically deleted (*B, 34) key from Page 2. This reuse of space shows why the maximum needed space for TAGG session state maintenance in a page is of the order of number of active TAGG sessions. After collecting from page 1 and page 2, client A pauses and gives up control to other database server processing that wants to modify database records. The control is given up only at page boundaries.

FIG. 2C, step 306, shows that database record K1 is updated at LSN 107 while the client A is in pause state at LSN 105. Page1 moves to the top of the tagger chain. When the client A restarts from pause state, it will have two pages to collect. The first page is Page 3 that has not yet been visited by Client A in this TAGG session; and the second is Page 1 that has already been visited by Client A in this TAGG session.

In FIG. 2D, step 308, client A restarts moving up the tagger chain from where it had paused with (L-start: 70 and L-pause: 105). While traversing the tagger chain, the client A visits page 3 that was never visited in this TAGG session, so it collects database records <K6; LSN 90> and <K7; LSN 106>. The system marks page 3 as visited and it is able to reuse space from its earlier session.

Client A further moves towards the top of the tagger chain and encounters page 1 which it has already visited in TAGG session 30. In this case since the page 1 has already been visited in TAGG session 30, the system collects database records greater than pause LSN(=105)-<K7; LSN 107>. If a state would have not been maintained in Page 1 then the system would have fetched all the database records that have changed since LSN 70 resulting in duplicates. Therefore by maintaining the client state, the system ensures that no duplicates are served to the client.

When it reaches at the top of the tagger chain, the TAGG session ends. The next session for client A will have an LSN-start of 107. Once a session is completed the session ID for client A is incremented to 31 and that logically frees up all (*A, 30) keys in the pages.

During a TAGG session the method efficiently identifies the database records that were updated since the client's last TAGG session. This is a very general-purpose approach where further logic can be inserted to determine what data should actually be served to the TAGG client. For example, if the requesting client is a cache, it can then just be served the keys that have changed so that the cache can invalidate these keys. If the requesting client is a cache or a replica of the database, then it can be served the latest value of every changed database record. A cache can be served mixture of invalidations and database record replicas based on constraints such as output size. The system can in a very general way compute TAGG client specific data for each changed database record thereby enabling powerful asynchronous, distributed, exactly-once computation. For client specific messages the database server has to know when the message has been delivered to the client so that it can lazily reclaim space occupied by those messages. For this purpose, a bulk acknowledgement scheme can be used. The server associates each client specific message with the LSN of the latest update that is aggregated into the message. When a client initiates a TAGG session then it also implicitly acknowledges all change records delivered in the previous TAGG session. When a new TAGG session is initiated by a client, the server can then lazily clean up all client specific messages that are associated with an LSN smaller than or equal the largest LSN delivered to the client in the previous TAGG session.

Figure 3:
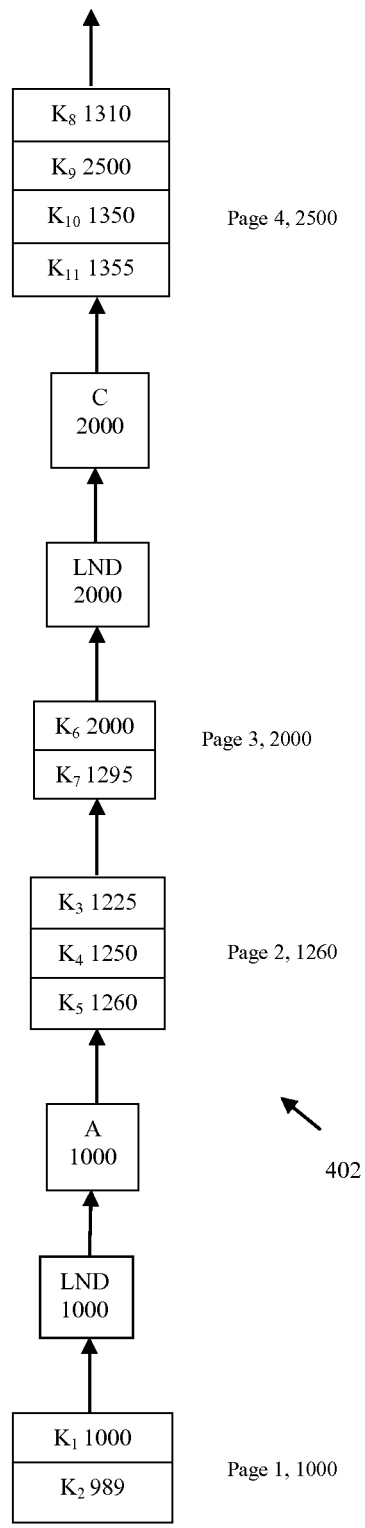
FIG. 3 shows a tagger chain with landmark node inserted after every 1000th LSN.

To locate the initial position of client at the registration time without having to scan the entire tagger chain the system periodically inserts landmark nodes at the top of the tagger chain. FIG. 3 shows a tagger chain 402 with landmark node inserted after every 1000th LSN. The landmark nodes can be inserted either as a function of time or as a function of LSN values. For instance, in a time-based landmark node, the tagger chain may insert a landmark node after every 15 minutes, or in a LSN based landmark node, the system may insert the landmark nodes after 1000th LSN values. Any system property that increases as LSN increases can be used to create landmark nodes. The system maintains a separate lookup structure on these landmark nodes. When a client comes to register and wants to tail changed database records from a particualar LSN or a particular time, then the system uses these landmark nodes to find the portion of the tagger chain that contains the exact starting position.

Recovery of tagger chain at database startup: To aid in recovery page LSNs are stored in the page metadata in the page table. At startup, standard database recovery also recovers the page table and with it all the page LSNs. The page LSNs are sorted and then the tagger chain is recreated by inserting the pages in their page LSN order. At startup LSN based landmark nodes are also inserted in the tagger chain.

The foregoing merely illustrates the principles of the present invention. Other variations to the disclosed embodiments can be understood and effected by those skilled in the art in practicing the claimed invention from a study of the drawings, the disclosure, and the appended claims. In the claims, the word "comprising" does not exclude other elements or steps and the indefinite article "a" or "an" does not exclude a plurality. The mere fact that certain measures are recited in mutually different dependent claims does not indicate that a combination of these measures cannot be used advantageously. Any reference signs in the claims should not be construed as limiting the scope of the claims. Various modifications and alterations to the described embodiments will be apparent to those skilled in the art in view of the teachings herein. It will thus be appreciated that those skilled in the art will be able to devise numerous techniques which, although not explicitly described herein, embody the principles of the present invention and are thus within the spirit and scope of the present invention. All references cited herein are incorporated herein by reference in their entireties.

The invention claimed is:

1. A method for a database server to support clients that want to observe all changes happening in the database server, the method comprising:
   (a) assigning a log sequence number to each database record and each page present in the database;
   (b) maintaining a chain which is a linked list of all the pages in the order they are modified;
   (c) maintaining a state for a plurality of clients on the chain, where the position of the client's state on the chain specifies the location from where to find changes that have not yet been served to the client;
   (d) maintaining a plurality of landmark nodes on the chain to help initially place clients on the chain when they register;
   (e) scanning all the pages in the chain from where the client's state is located to the top of the chain, thereby collecting all changed database records that have not yet been delivered to the client, wherein multiple updates to a database record is delivered as a single change record to the client;
   (f) identifying the changed database records that have to be served while scanning the chain;
   (g) applying further processing to each database record and its aggregated updates to create corresponding change records; and
   (h) delivering the changed records to the client.

2. The method of claim 1 wherein the database records are assigned a log sequence number in the order they were modified.

3. The method of claim 1 wherein the landmarks nodes are inserted as a function of time or the log sequence number or a system property that increases with log sequence number.

4. The method of claim 1 wherein the server can recover the chain at database startup.

5. A method for a database server to support clients that want to observe all changes happening in the database server, the method comprising:
   (a) assigning a log sequence number to each database record and each page present in the database;
   (b) maintaining a chain which is a linked list of all the pages in the order they are modified;
   (c) maintaining a state for a plurality of clients on the chain, where the position of the client's state on the chain specifies the location from where to find changes that have not yet been served to the client;
   (d) maintaining a session for each client while changes are being collected for a client
   (e) maintaining enough session state to ensure exactly once delivery of each change further comprising;
   (f) managing space for the session state management;
   (g) maintaining a plurality of landmark nodes on the chain to help initially place clients on the chain when they register;
   (h) scanning all the pages in the chain from where the client's state is located to the top of the chain, thereby collecting all changed database records that have not yet been delivered to the client, wherein multiple updates to a database record is delivered as a single change record to the client;
   (i) identifying the changed database records that have to be served while scanning the chain;
   (j) applying further processing to each database record and its aggregated updates to create corresponding change records; and
   (k) delivering the changed records to the client.

6. The method of claim 5 wherein the database records are assigned a log sequence number in the order they were modified.

7. The method of claim 5 wherein the landmark nodes are inserted as a function of time or the log sequence number or a system property that increases with log sequence number.

8. The method of claim 5 wherein server maintains enough state to remember which database change has already been collected for the client.

9. The method of claim 5 wherein the space requirement for the session state is of the order of pages visited during a session.

10. The method of claim 5 wherein the session state of the plurality of clients can be stored in page or in a separate data structure.

11. The method of claim 5 wherein the space occupied by the session state can be recovered once the session is complete.

12. The method of claim 5 wherein a garbage collection of the space freed by the completed session can be done lazily by the system.

13. The method of claim 5 wherein the server can recover the chain at database startup.

* * * * *